United States Patent
Brown et al.

(10) Patent No.: US 9,594,654 B2
(45) Date of Patent: Mar. 14, 2017

(54) GENERATING AND DETECTING HANG SCENARIOS IN A PARTIALLY POPULATED SIMULATION ENVIRONMENT

(71) Applicant: International Business Machines Corporation, Armonk, NY (US)

(72) Inventors: Aaron C. Brown, Austin, TX (US); David W. Cummings, Round Rock, TX (US); Jeff J. Frankeny, Austin, TX (US); Jonathan R. Jackson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/140,003

(22) Filed: Dec. 24, 2013

(65) Prior Publication Data

US 2015/0178174 A1 Jun. 25, 2015

(51) Int. Cl.
*G06F 9/44* (2006.01)
*G06F 13/10* (2006.01)
*G06F 13/12* (2006.01)
*G06F 11/26* (2006.01)

(52) U.S. Cl.
CPC .................. *G06F 11/261* (2013.01)

(58) Field of Classification Search
CPC ............... G06F 17/5022; G06F 11/261; G06F 11/3457; H04L 41/145; H05K 999/99
USPC .......................................................... 703/21
See application file for complete search history.

(56) References Cited

U.S. PATENT DOCUMENTS

| | | | |
|---|---|---|---|
| 5,465,364 A * | 11/1995 | Lathrop | G06F 13/102 703/20 |
| 8,286,033 B2 | 10/2012 | Li et al. | |
| 8,301,593 B2 | 10/2012 | Hoffmann et al. | |
| 2002/0152456 A1 * | 10/2002 | Nightingale | 717/135 |
| 2012/0233509 A1 | 9/2012 | Kojima | |
| 2012/0297099 A1 | 11/2012 | Kochar et al. | |

OTHER PUBLICATIONS

Wang, L. et al.; "Reliability MicroKernel: providing application-aware reliability in the OS"; IEEE Transactions on Reliability, vol. 56, No. 4, pp. 597-614, Dec. 2007.

(Continued)

*Primary Examiner* — Saif Alhija
(74) *Attorney, Agent, or Firm* — Terrile, Cannatti, Chambers & Holland, LLP; Stephen A. Terrile (57) ABSTRACT

A method, system and computer-usable medium are disclosed for detecting the cause of a system hang in a verification environment. Hardware components associated with the design under test that are not included in the verification environment are replaced by software drivers. A dependency is set between a first driver and a second driver such that quiescing of the first driver is prevented until the second driver is quiesced. Each driver in a simulation test is designated to be either independent or dependent, with each dependent driver being associated with at least one independent driver. The independent driver is quiesced at a predetermined time. Dependent drivers do not quiesce until of their associated drivers have quiesced and completed all of their respectively issued instructions.

17 Claims, 5 Drawing Sheets

(56) References Cited

OTHER PUBLICATIONS

Kyne, F. et al.; "IBM z/OS Parallel Sysplex Operational Scenarios"; IBM Corporation, www.ibm.com/redbooks/sg24-2079-00 . . . ; May 2009.
Dufrasne, B. et al.; "DS8000 Copy Services for IBM i with VIOS"; IBM Corporation, www.ibm.com/redbooks/redp4584-00 . . . ; Nov. 2009.

* cited by examiner

GENERATING AND DETECTING HANG SCENARIOS IN A PARTIALLY POPULATED SIMULATION ENVIRONMENT

BACKGROUND OF THE INVENTION

Field of the Invention

The present invention relates in general to the field of computers and similar technologies, and in particular to software utilized in this field. Still more particularly, it relates to a method, system and computer-usable medium for detecting the cause of a system hang in a verification environment.

Description of the Related Art

Today's computing environments continue to grow in scale and complexity, placing ever-greater demands upon system performance, reliability and availability. These demands often result from the constantly increasing amount of data sharing and volumes of transaction processing inherent in large system applications. Another aspect of these demands is the unpredictability of their workloads, which mandate that these systems not only be highly scalable, but also support concurrent processes that may unexpectedly conflict with one another and cause the system to hang. As a result, it is common to conduct hardware testing in a verification environment to detect potential causes of system hangs.

However, certain classes of system hangs are difficult to expose using traditional random irritation techniques. For example, deadlock is a situation where two or more processes in a data processing system are unable to proceed because each is waiting for one of the others to do something. A common example is a program communicating to a server that may be in a state of waiting for output from the server before sending any additional data to the server. Meanwhile, the server is similarly waiting for more input from the controlling program before it is able to produce an output.

Another example of a system hang is a livelock, which is similar to a deadlock, except that the state of the two processes involved in the livelock constantly changes with regards to the other process. For example, two or more processing elements may be stuck in loops because each processing element repeatedly reaches a point in the loop where it must request the other to retry a particular command. A livelock can occur, for example, when a process that calls another process is itself called by that process. Such livelocks may be caused by a software or hardware design issue.

SUMMARY OF THE INVENTION

A method, system and computer-usable medium are disclosed for detecting the cause of a system hang in a verification environment. In various embodiments, hardware components associated with the design under test that are not included in the verification environment are replaced by software drivers. In these various embodiments, a dependency is set between a first driver and a second driver in the verification environment such that quiescing of the first driver is prevented until the second driver is quiesced.

In various embodiments, each driver in a simulation test is designated to be either independent or dependent. Each dependent driver is associated with at least one independent driver. The independent driver is quiesced at a predetermined time. In these embodiments, the dependent drivers do not quiesce until all of their associated drivers have quiesced and completed all of their respectively issued instructions. In certain embodiments, an independent driver can be associated with a dependent driver and an independent driver. In these embodiments, the association between the various independent and dependent drivers establishes a driver dependency chain.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for detecting the cause of a system hang in a verification environment. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
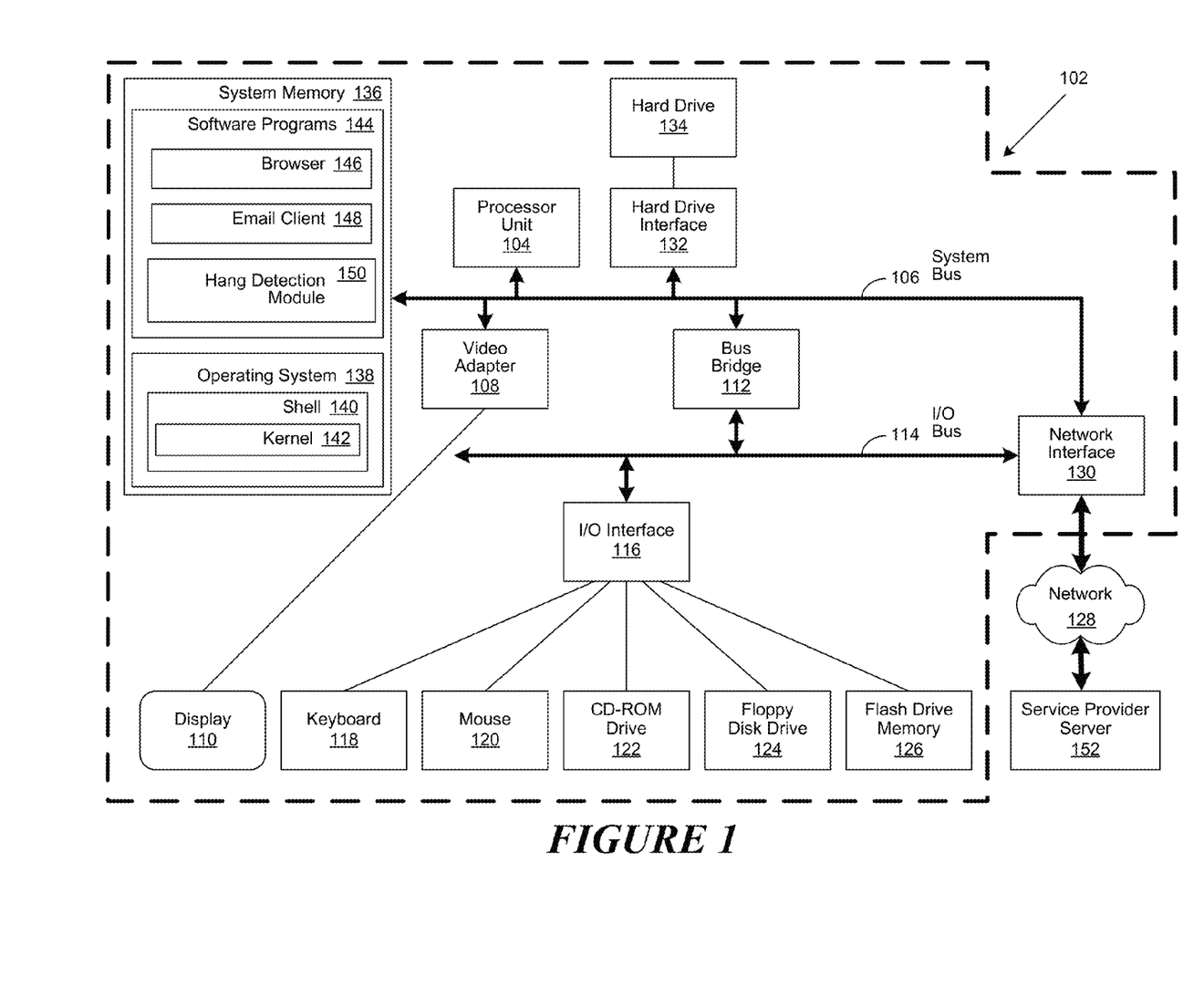
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a hang detection module 150. In these and other embodiments, the hang detection module 150 includes code for implementing the processes described hereinbelow. In one embodiment, client computer 102 is able to download the hang detection module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2A:
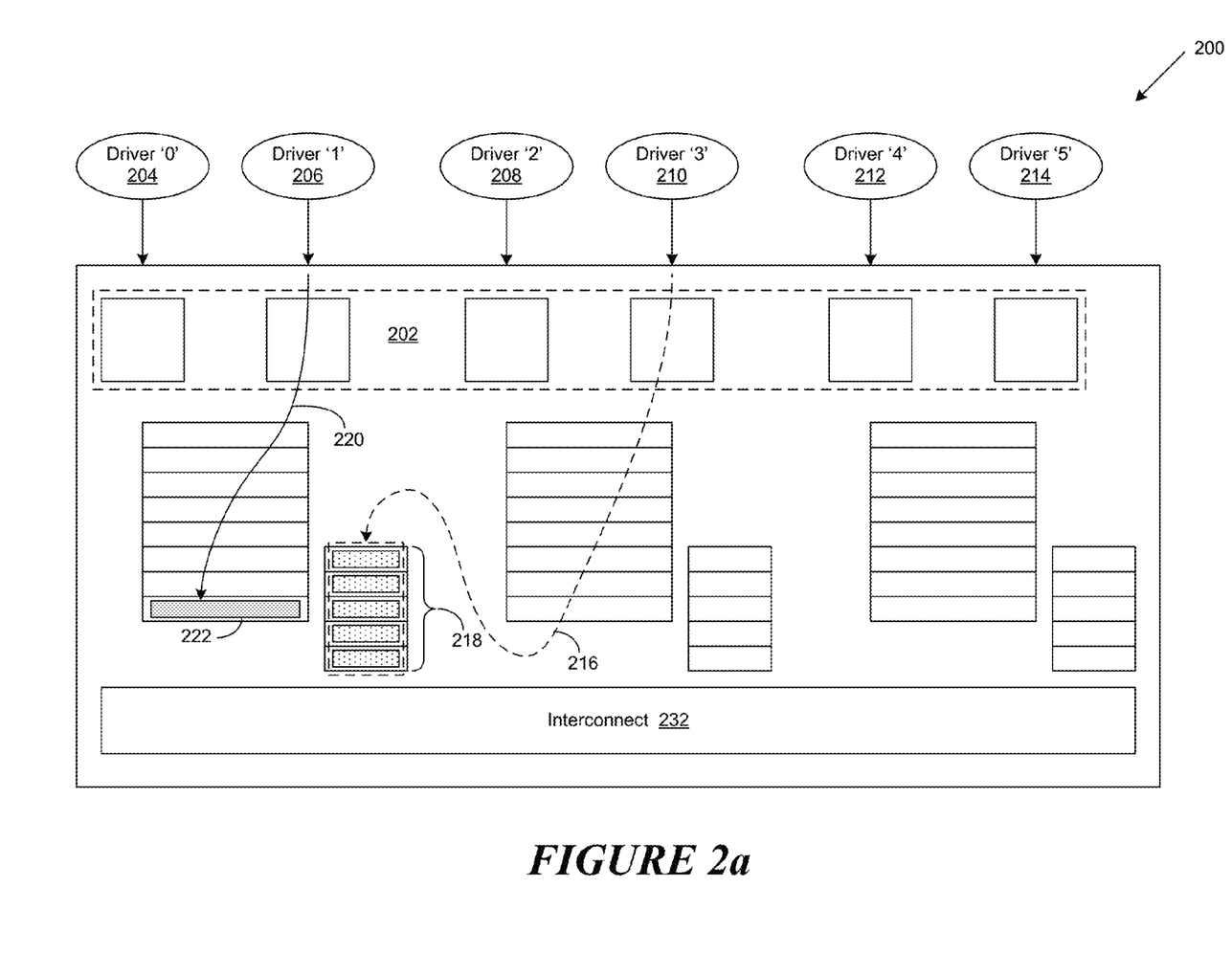
FIGS. 2a and 2b show a verification environment in which a design under test is partially populated with hardware components.
Figure 2B:
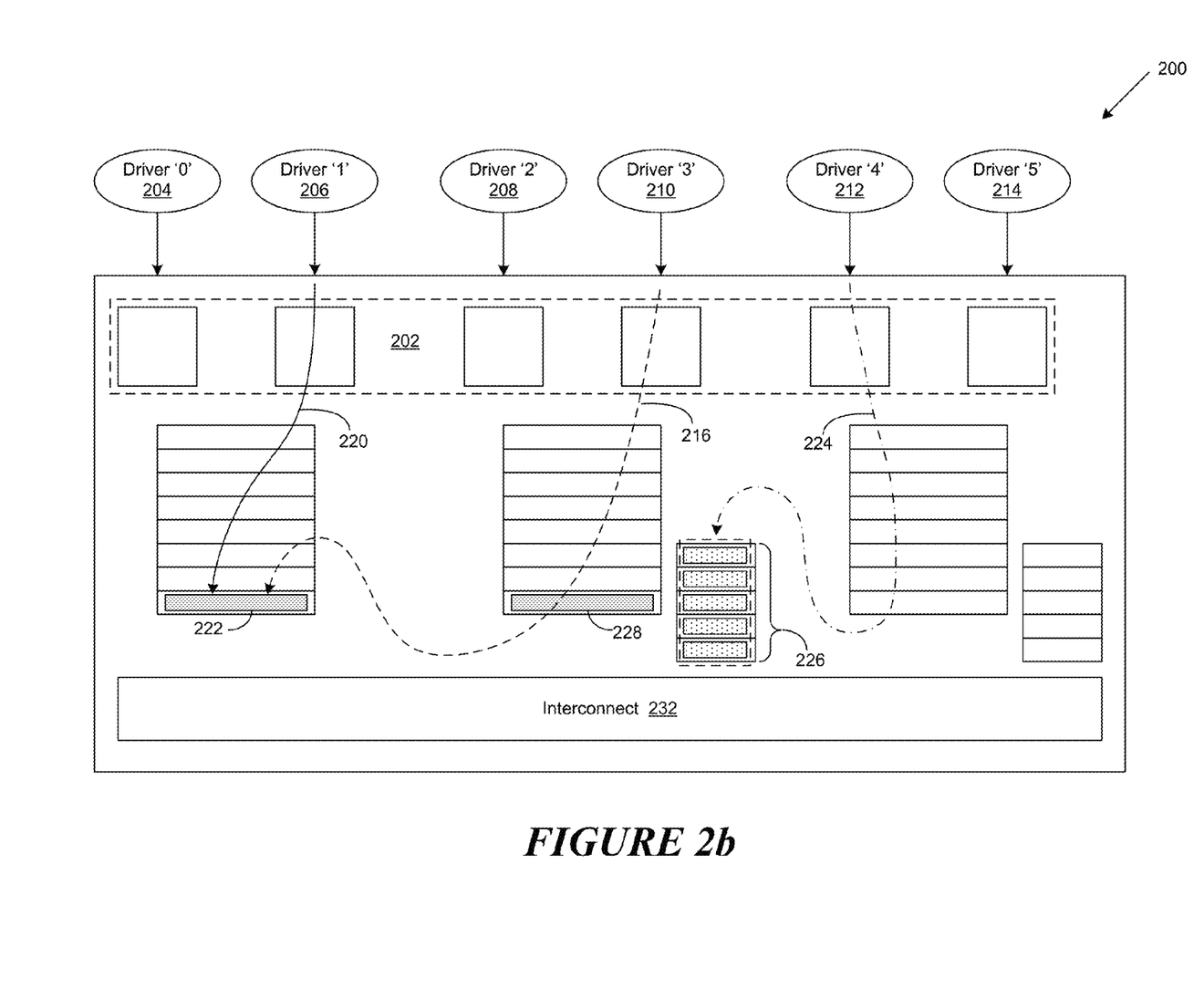

FIGS. 2a and 2b show a verification environment in which a design under test is partially populated with hardware components in accordance with an embodiment of the invention. In various embodiments, the verification environment 200 may include various hardware components 202 familiar to those of skill in the art, such as a memory controller, an input/output (I/O) device, L2 or L3 memory cache, etc. In these and other embodiments, the verification environment may include an interconnect 222, likewise familiar to skilled practitioners of the art, configured to facilitate communication with other hardware components (e.g., processors, etc.), systems, and sets of operational logic.

In various embodiments, hardware components associated with the design under test that are not included in the verification environment 200 are replaced by software drivers '0' 204, '1' 206, '2' 208, '3' 210, '4' 212, and '5' 214. As used herein, the software drivers '0' 204, '1' 206, '2' 208, '3' 210, '4' 212, and '5' 214 respectively refer to a set of operational logic configured to generate instructions as if the instructions were generated by a hardware component. Accordingly, the software drivers '0' 204, '1' 206, '2' 208, '3' 210, '4' 212, and '5' 214 in these embodiments are executed to simulate the design under test as if it were connected to one or more actual hardware components.

In various embodiments, the software drivers '0' 204, '1' 206, '2' 208, '3' 210, '4' 212, and '5' 214 are implemented to generate their associated instructions in a random order. For example, if each of the software drivers '0' 204, '1' 206, '2' 208, '3' 210, '4' 212, and '5' 214 represent a processor core driving a storage sub-system, individual software drivers would randomly generate a command (i.e., an instruction) along with its associated parameters. To further the example, the associated parameters may include an address, a command type (e.g., load, store, sync, larx, etc.), or a size tag. In certain embodiments, the software drivers '0' 204, '1' 206, '2' 208, '3' 210, '4' 212, and '5' 214 may schedule a predetermined command, or instruction, to be driven at a predetermined time. It will be appreciated that many such embodiments are possible and the foregoing is not intended to limit the spirit, scope or intent of the invention.

In these various embodiments, the generation of instructions by the software drivers '0' 204, '1' 206, '2' 208, '3' 210, '4' 212, and '5' 214 is ceased after a predetermined time interval to allow any uncompleted instructions to finish execution in the hardware components 202. This predetermined time interval is referred to herein as quiesce time (QuiesceTime). In certain embodiments, quiesce is defined as pausing or altering a state of running of processes on a driver.

In certain embodiments, the quiesce time is defined by a predetermined number of instruction cycles respectively performed by the software drivers '0' 204, '1' 206, '2' 208, '3' 210, '4' 212, and '5' 214. In these embodiments, the software drivers '0' 204, '1' 206, '2' 208, '3' 210, '4' 212, and '5' 214 will no longer generate new commands once the predetermined number of instruction cycles have been completed. In various embodiments, the quiesce time might be different for each of the software drivers '0' 204, '1' 206, '2' 208, '3' 210, '4' 212, and '5' 214.

Skilled practitioners of the art will be appreciate that the test may or may not complete satisfactorily once the quiesce time for any predetermined software driver '0' 204, '1' 206, '2' 208, '3' 210, '4' 212, '5' 214 has expired. For example, the design under test may fail due to a system hang. As used herein, a system hang broadly refers to a freezing condition where one or more of the hardware components 202 cannot complete execution of their associated processes.

Referring now to FIG. 2a, continuous requests 216 in the form of instructions from software diver '3' 210 replenish the instruction queue 218. In turn, the instruction 222 resulting from a request 220 from software driver '1' 206 remains blocked. As a result, a livelock occurs between the instruction 222 resulting from the request 220 generated by software driver '1' 206 and the instruction queue 218 resulting from requests 216 generated by software driver '3' 210. This livelock is not resolved until the software driver '3' 210 ceases the generation of requests 216 and the instruction queue 218 empties.

In current approaches, software driver '3' 210 ceases the generation of requests 216 when it reaches an associated, predetermined QuiesceTime. At that time, the instruction queue 218 empties and the instruction 222 can complete its execution as it is no longer blocked by the instruction queue 218. However, it will be appreciated that it would be advantageous to have the ability to expose potential system hangs by randomly selecting software drivers '0' 204, '1' 206, '2' 208, '3' 210, '4' 212, '5' 214 and likewise randomly select a QuiesceTime for each. Further, it would also be advantageous to end individual, or combined, system verification tests within a predetermined amount of time.

In various embodiments, these objectives are addressed by first establishing dependency relationships between the software drivers '0' 204, '1' 206, '2' 208, '3' 210, '4' 212, and '5' 214 instead of establishing a fixed, predetermined QuiesceTime for each individual software drive. In these embodiments, each of the software drivers '0' 204, '1' 206, '2' 208, '3' 210, '4' 212, and '5' 214 is assigned a mode, "independent" or "dependent," each time a design-under-test session is initiated.

As used herein, an independent driver refers to a software driver that will quiesce when it reaches a predetermined number of cycles, such as the number of cycles determined by its associated QuiesceTime. Dependent drivers, however, are software drivers that will be assigned a driver or set of drivers that they are dependent upon. As such, these dependent driver will not quiesce until its assigned drivers have quiesced and all commands issued from the assigned drivers have completed execution in the in the hardware components 202.

Accordingly, software driver '1' 206 has quiesced, with an associated instruction 222 still pending execution, when the system hang has reached steady state. Further, software driver '3' 210 is prevented from quiescing because of the pending execution 222 associated with software driver '1' 206. Moreover, software driver '3' 210 continues to generate new requests 216, resulting in instructions filling the instruction queue 218, which perpetuates the system hang.

It will be appreciated that more complicated hang scenarios can be exposed by generating chains of driver dependencies or by making multiple drivers dependent upon the same independent software driver. In various embodiments, the chains of driver dependencies are referenced as a driver dependency chain, where the length of the chain is defined by the number of driver dependency instances.

For example, as shown in FIG. 2b, independent software driver '1' 206 is dependent upon software driver '3' 210, which in turn is dependent upon software driver '4' 212. As a result, continuous requests 224 in the form of instructions from software diver '4' 212 replenish the instruction queue 226, which causes a livelock with instruction 228 that results from the request 216 from software driver '3' 210. In turn, since the instruction 228 remains blocked, the instruction 222 resulting from the request 220 from software driver '1' 206 being blocked as well.

As a result, the instruction 222 associated with independent software driver '1' 206 cannot be executed until the instruction 228 associated with dependent software driver '3' 210 is executed. Further, the instruction 228 associated with dependent software driver '3' 210 cannot be executed until the instruction queue 226 associated with dependent software driver '4' 212 is emptied. It will likewise be appreciated that while FIGS. 2a and 2b only show software drivers '0' 204, '1' 206, '2' 208, '3' 210, '4' 212, and '5' 214, any number of software drivers, independent or dependent, can be implemented in various embodiments.

Figure 3A:
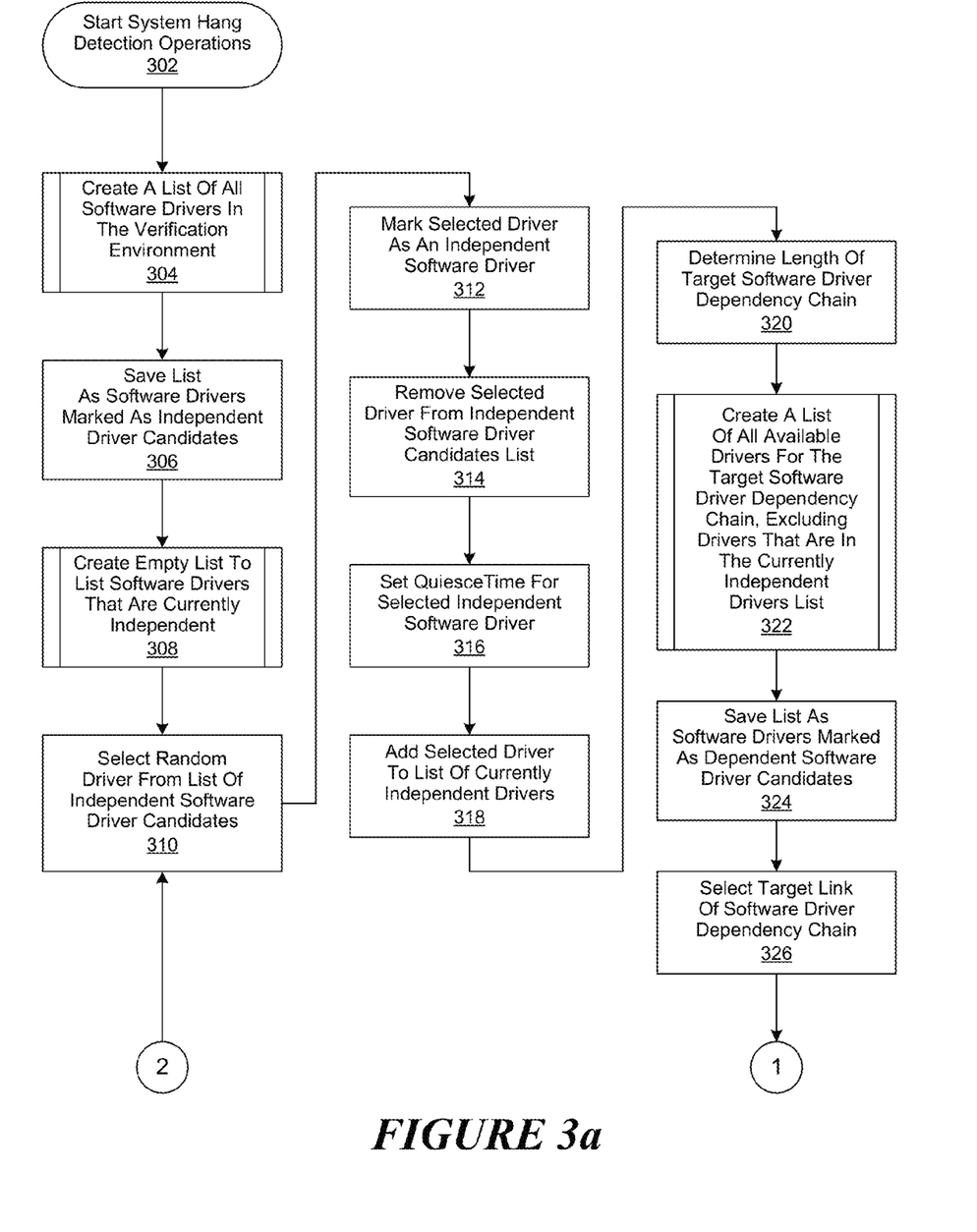
FIGS. 3a and 3b are a generalized flowchart showing system hang detection operations performed in a verification environment.
Figure 3B:
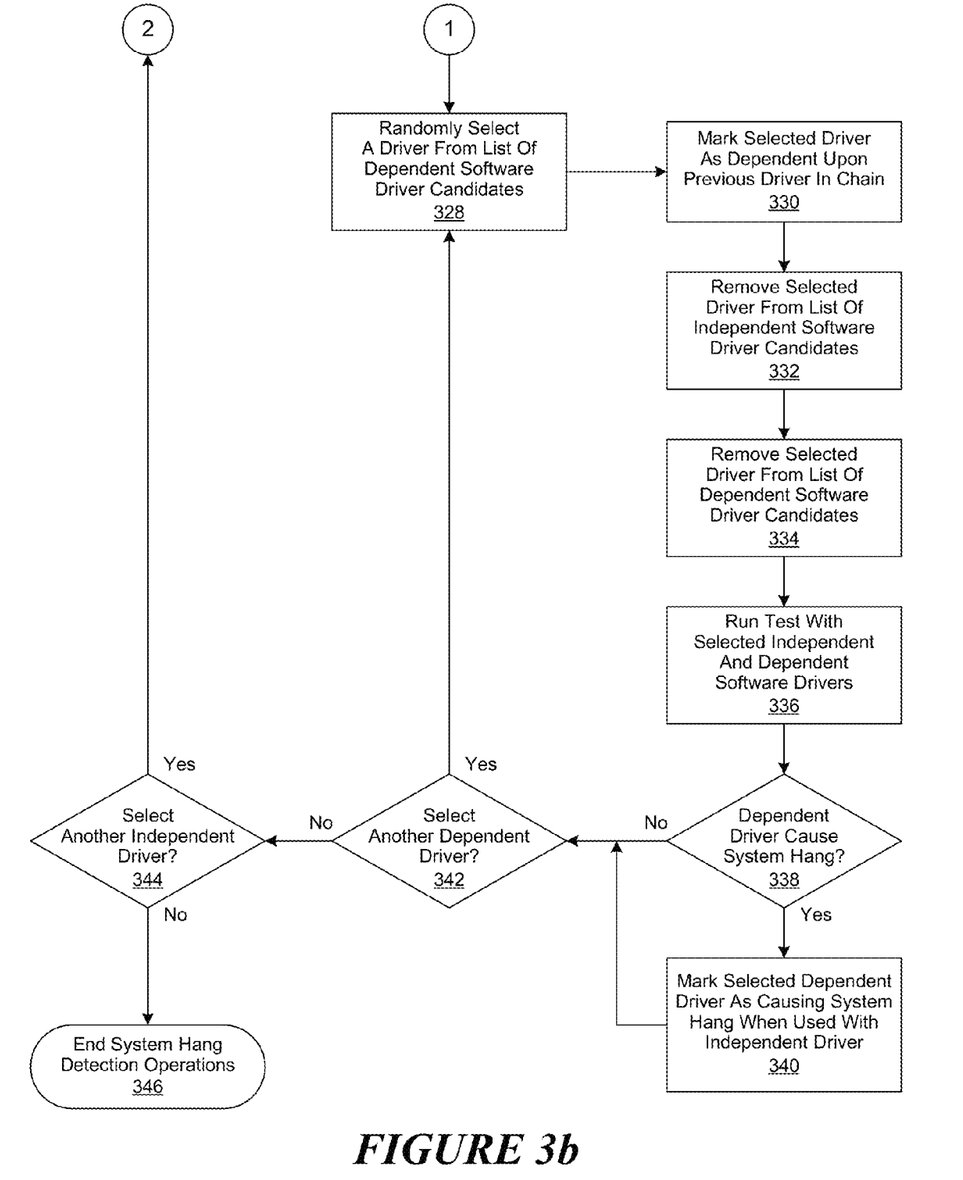

FIGS. 3a and 3b are a generalized flowchart showing system hang detection operations performed in a verification environment implemented in accordance with an embodiment of the invention. In this embodiment, system hang detection operations are begun in step 302, followed by the creation of a list in step 304 of all software drivers in the verification environment. The resulting list is then saved in step 306 as a list of software drivers marked as independent software driver candidates (IndependentDriverCandidates).

An empty list of software drivers is then created in step 308, which will hold currently independent drivers (IndependentDrivers).

A random software driver is then selected from the IndependentDriverCandidates list in step 310, followed by marking the selected software driver as an independent software driver in step 312. The selected driver is then removed from the IndependentDriverCandidates list in step 310, followed by setting a QuiesceTime for the selected driver in step 316. The selected driver is then added to the IndependentDrivers list in step 318 and the length of the target software driver dependency chain is determined in step 320.

A list of all available drivers (DependentDriverCandidatesForThisChain) for the target software driver dependency chain is then created in step 322, excluding software drivers that are currently in the IndependentDrivers list. The resulting list is then saved in step 324 as a list of dependent software driver candidates (DependentDriverCandidatesForThisChain) for the target software driver dependency chain.

A link in the target software driver dependency chain is selected in step 326, followed by the random selection of a software driver is randomly from the DependentDriverCandidatesForThisChain list in step 328. The selected driver is then marked in step 330 as being dependent upon the previous driver in the target software driver dependency chain. The selected software driver is then removed from the IndependentDriverCandidates list in step 332 to prevent it from being subsequently marked as an independent software driver. Likewise, the selected software driver is also removed from the DependentDriverCandidatesForThisChain list in step 334 to prevent it from subsequently being used again in the target software driver dependency chain.

The currently selected independent and dependent software drivers are then used in step 336 to run unit tests in the verification environment, followed by a determination being made in step 338 whether the dependent software driver caused a system hang. If so, then the previously selected dependent software driver is marked in step 340 as causing a system hang when used with the previously selected independent driver. Thereafter, or if was determined in step 338 that the previously selected dependent software driver did not cause a system hang, then a determination is made in step 342 whether to select another dependent driver from the DependentDriverCandidatesForThisChain list in step 342. If so, then the process is continued, proceeding with step 328. If not, then a determination is made in step 344 whether to select another independent software driver from the IndependentDriverCandidates list. If so, then the process is continued, proceeding with step 310. Otherwise, system hang detection operations are ended in step 346.

Although the present invention has been described in detail, it should be understood that various changes, substitutions and alterations can be made hereto without departing from the spirit and scope of the invention as defined by the appended claims.

What is claimed is:

1. A computer-implemented method for detecting the cause of a system hang, comprising:

setting a dependency between a first driver and a second driver in a verification environment, the first driver and second driver being associated with a respective first hardware component and a second hardware component, the first driver and the second driver generating instructions as if the instructions were generated by the first hardware component and the second hardware component, the instructions being executed by a verification environment, the verification environment comprising additional hardware components in addition to the first hardware component and the second hardware component, the first driver and second driver replacing the first hardware component and the second hardware component, respectively, the first hardware component and the second hardware component not being included in the verification environment;

assigning a first quiesce time to the first driver, the first quiesce time corresponding to a predetermined number of instruction cycles performed by the first driver, the first driver not generating new commands until the predetermined number of instruction cycles have been completed;

assigning a second quiesce time to the second driver, the second quiesce time corresponding to a predetermined number of instruction cycles performed by the second driver, the second driver not generating new commands until the predetermined number of instruction cycles have been completed;

preventing quiescing of the first driver until the second driver is quiesced;

assigning each driver in a simulation test a mode selected from a group consisting of independent and dependent;

associating each dependent driver with at least one independent driver;

quiescing each independent driver at a predetermined quiesce time, the predetermined quiesce time corresponding to the first quiesce time when the first driver is an independent driver, the predetermined quiesce time corresponding to the second quiesce time when the second driver is an independent driver;

preventing quiescing of each dependent driver until all of its associated independent drivers have quiesced; and, detecting whether a design under test fails due to a system hang when one or more of the first hardware component, the second hardware component, and any of the additional hardware components cannot complete execution of their associated processes.

2. The method of claim 1, wherein the associated dependent drivers do not quiesce until all instructions respectively issued by each dependent driver have completed.

3. The method of claim 1, wherein each independent driver can be associated with a dependent driver and an independent driver.

4. The method of claim 3, wherein the association results in the definition of a driver dependency chain.

5. The method of claim 1, wherein the verification environment is partially populated with hardware.

6. A system comprising:

a processor;

a data bus coupled to the processor; and a computer-usable medium embodying computer program code, the computer-usable medium being coupled to the data bus, the computer program code used for detecting the cause of a system hang and comprising instructions executable by the processor and configured for:

setting a dependency between a first driver and a second driver in a verification environment, the first driver and second driver being associated with a respective first hardware component and a second hardware component, the first driver and the second driver generating instructions as if the instructions were generated by the first hardware component and the second hardware component, the instructions being executed by a verification environment, the verification environment comprising additional hardware components in addition to the first hardware component and the second hardware component, the first driver and second driver replacing the first hardware component and the second hardware component, respectively, the first hardware component and the second hardware component not being included in the verification environment;

assigning a first quiesce time to the first driver, the first quiesce time corresponding to a predetermined number of instruction cycles performed by the first driver, the first driver not generating new commands until the predetermined number of instruction cycles have been completed;

assigning a second quiesce time to the second driver, the second quiesce time corresponding to a predetermined number of instruction cycles performed by the second driver, the second driver not generating new commands until the predetermined number of instruction cycles have been completed;

preventing quiescing of the first driver until the second driver is quiesced;

assigning each driver in a simulation test a mode selected from a group consisting of independent and dependent;

associating each dependent driver with at least one independent driver;

quiescing each independent driver at a predetermined quiesce time, the predetermined quiesce time corresponding to the first quiesce time when the first driver is an independent driver, the predetermined quiesce time corresponding to the second quiesce time when the second driver is an independent driver;

preventing quiescing of each dependent driver until all of its associated independent drivers have quiesced; and, detecting whether a design under test fails due to a system hang when one or more of the first hardware component, the second hardware component, and any of the additional hardware components cannot complete execution of their associated processes.

7. The system of claim 6, wherein the associated dependent drivers do not quiesce until all instructions respectively issued by each dependent driver have completed.

8. The system of claim 6, wherein each independent driver can be associated with a dependent driver and an independent driver.

9. The system of claim 8, wherein the association results in the definition of a driver dependency chain.

10. The system of claim 6, wherein the verification environment is partially populated with hardware.

11. A non-transitory computer-readable storage medium embodying computer program code, the computer program code comprising computer executable instructions configured for:

setting a dependency between a first driver and a second driver in a verification environment, the first driver and second driver being associated with a respective first hardware component and a second hardware component, the first driver and the second driver generating instructions as if the instructions were generated by the first hardware component and the second hardware component, the instructions being executed by a verification environment, the verification environment comprising additional hardware components in addition to the first hardware component and the second hardware component, the first driver and second driver replacing the first hardware component and the second hardware component, respectively, the first hardware component and the second hardware component not being included in the verification environment;

assigning a first quiesce time to the first driver, the first quiesce time corresponding to a predetermined number of instruction cycles performed by the first driver, the first driver not generating new commands until the predetermined number of instruction cycles have been completed;

assigning a second quiesce time to the second driver, the second quiesce time corresponding to a predetermined number of instruction cycles performed by the second driver, the second driver not generating new commands until the predetermined number of instruction cycles have been completed;

preventing quiescing of the first driver until the second driver is quiesced;

assigning each driver in a simulation test a mode selected from a group consisting of independent and dependent;

associating each dependent driver with at least one independent driver;

quiescing each independent driver at a predetermined quiesce time, the predetermined quiesce time corresponding to the first quiesce time when the first driver is an independent driver, the predetermined quiesce time corresponding to the second quiesce time when the second driver is an independent driver;

preventing quiescing of each dependent driver until all of its associated independent drivers have quiesced; and, detecting whether a design under test fails due to a system hang when one or more of the first hardware component, the second hardware component, and any of the additional hardware components cannot complete execution of their associated processes.

12. The non-transitory computer-readable storage medium of claim 11, wherein the associated dependent drivers do not quiesce until all instructions respectively issued by each dependent driver have completed.

13. The non-transitory computer-readable storage medium of claim 11, wherein each independent driver can be associated with a dependent driver and an independent driver.

14. The non-transitory computer-readable storage medium of claim 13, wherein the association results in the definition of a driver dependency chain.

15. The non-transitory computer-readable storage medium of claim 11, wherein the verification environment is partially populated with hardware.

16. The non-transitory computer-readable storage medium of claim 11, wherein the computer executable instructions are deployable to a client system from a server system at a remote location.

17. The non-transitory computer-readable storage medium of claim 11, wherein the computer executable instructions are provided by a service provider to a user on an on-demand basis.

* * * * *